United States Patent
Lamba et al.

(10) Patent No.: US 11,283,869 B2
(45) Date of Patent: Mar. 22, 2022

(54) DATA GOVERNANCE IN A DISPERSED STORAGE NETWORK USING BUCKET TEMPLATES

(71) Applicant: INTERNATIONAL BUSINESS MACHINES CORPORATION, Armonk, NY (US)

(72) Inventors: Amit Lamba, Buffalo Grove, IL (US); Shibhani Rai, Schaumburg, IL (US); Nicholas Georg Lange, Chicago, IL (US); Michael Lyons, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/829,678

(22) Filed: Mar. 25, 2020

(65) Prior Publication Data
US 2021/0306418 A1 Sep. 30, 2021

(51) Int. Cl.
*G06F 15/16* (2006.01)
*G06F 9/54* (2006.01)
*H04L 29/06* (2006.01)
*H04L 67/1097* (2022.01)
*H04L 67/60* (2022.01)

(52) U.S. Cl.
CPC .......... *H04L 67/1097* (2013.01); *G06F 9/541* (2013.01); *H04L 67/32* (2013.01)

(58) Field of Classification Search
CPC ... G06F 16/2365; G06F 3/067; H04L 67/1097
USPC .......................................... 726/219; 709/219
See application file for complete search history.

(56) References Cited

U.S. PATENT DOCUMENTS

| | | | |
|---|---|---|---|
| 6,405,368 B1* | 6/2002 | Freyburger | G06F 8/41 717/102 |
| 10,482,269 B1 | 11/2019 | Carroll et al. | |
| 2005/0085937 A1* | 4/2005 | Goodwin | G06F 8/60 700/107 |
| 2014/0129924 A1* | 5/2014 | Le Bescond de Coatpont | G06F 16/958 715/234 |
| 2017/0006099 A1* | 1/2017 | Kazi | H04L 67/1095 |

(Continued)

OTHER PUBLICATIONS

Anonymous, "A Method and System for Enabling Restricted Anonymous Access Operations", IP.com, Feb. 27, 2017, 2 pages.

(Continued)

*Primary Examiner* — Hamza N Algibhah
(74) *Attorney, Agent, or Firm* — Anthony England; Andrew D. Wright; Roberts Calderon Safran & Cole, P.C.

(57) ABSTRACT

Methods and systems for data governance in a dispersed storage network using bucket templates are disclosed. A method includes: creating, by a computing device, a bucket template in a dispersed storage network (DSN) based on a first request, the bucket template including at least a first bucket parameter and at least one allowed value for the first bucket parameter; receiving, by the computing device, a second request to create a bucket in the DSN, the second request including at least a first value for the first bucket parameter; and creating, by the computing device, the bucket based on the first value for the first bucket parameter in the second request and the at least one allowed value for the first bucket parameter in the bucket template.

20 Claims, 7 Drawing Sheets

(56) References Cited

U.S. PATENT DOCUMENTS

| | | | | |
|---|---|---|---|---|
| 2017/0177699 | A1* | 6/2017 | Chan | G06F 16/84 |
| 2017/0300259 | A1* | 10/2017 | Ciltone | H04L 63/101 |
| 2018/0046609 | A1* | 2/2018 | Agarwal | G06F 8/38 |
| 2018/0067807 | A1* | 3/2018 | Baptist | G06F 3/064 |
| 2018/0097881 | A1* | 4/2018 | Resch | G06F 3/0641 |
| 2018/0285237 | A1* | 10/2018 | Scott | G06F 8/71 |
| 2019/0065766 | A1 | 2/2019 | Resch et al. | |
| 2019/0123963 | A1* | 4/2019 | Tang | H04W 48/18 |
| 2019/0132388 | A1* | 5/2019 | Gawad | G06F 16/2272 |
| 2019/0158455 | A1* | 5/2019 | Hegde | G06F 16/2379 |
| 2020/0007622 | A1* | 1/2020 | Ciltone | H04L 67/1095 |
| 2020/0081640 | A1* | 3/2020 | Enz | G06F 13/4027 |
| 2020/0097234 | A1* | 3/2020 | Roberts | G06F 3/1204 |

OTHER PUBLICATIONS

Anonymous, "Method and System for Enabling Identity-based Data Policies in a Dispersed Storage Network (DSN)", IP.com, Jan. 30, 2018, 3 pages.

Mell et al., "The NIST Definition of Cloud Computing", NIST, Special Publication 800-145, Sep. 2011, 7 pages.

* cited by examiner

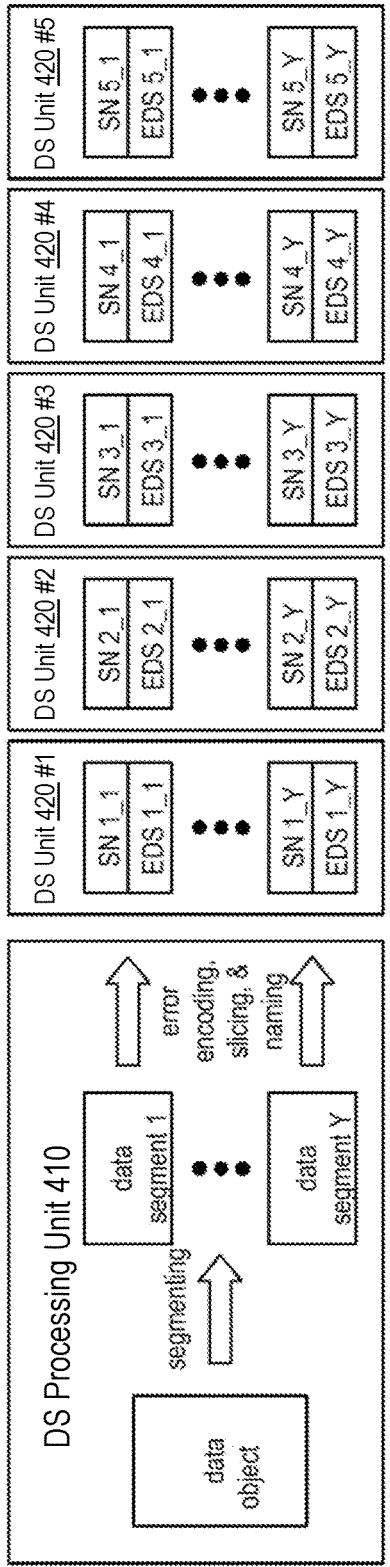
FIG. 5
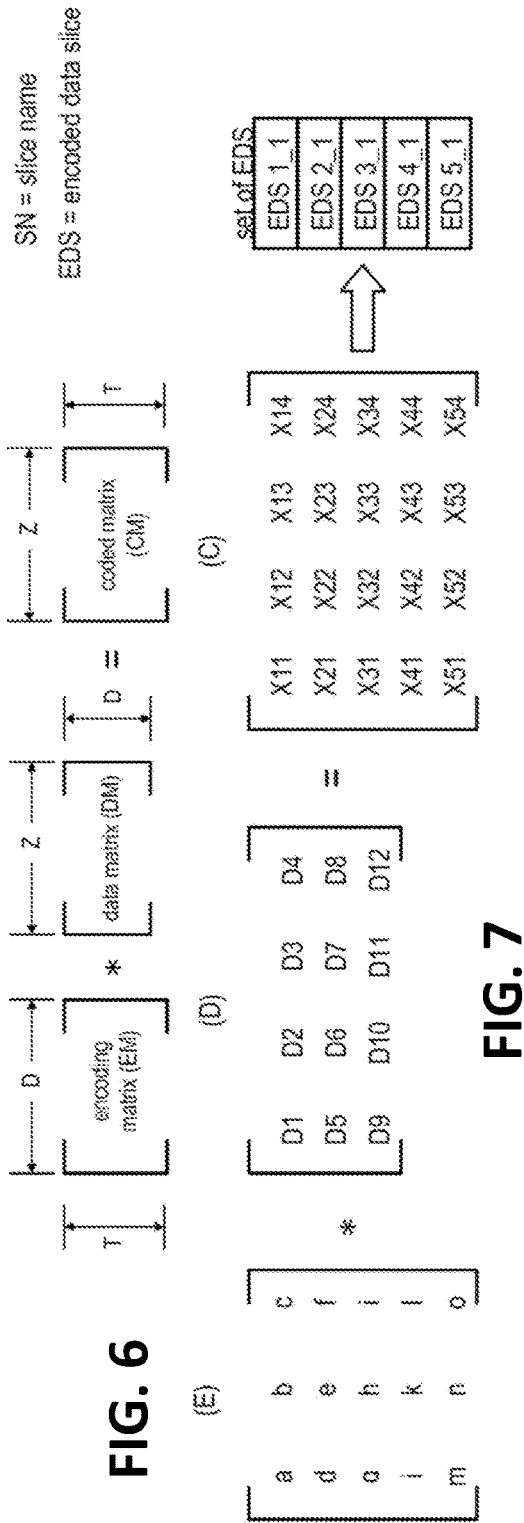
FIG. 6
FIG. 7
FIG. 8

DATA GOVERNANCE IN A DISPERSED STORAGE NETWORK USING BUCKET TEMPLATES

BACKGROUND

Aspects of the present invention generally relate to computing devices and, more particularly, to methods and systems for data governance in a dispersed storage network using bucket templates.

Computing devices communicate data, process data, and/or store data. Such computing devices range from wireless smart phones, laptops, tablets, personal computers (PCs), work stations, and video game devices, to data centers that support millions of web searches, stock trades, or online purchases every day. Computing devices typically include a central processing unit (CPU), a memory system, user input/output interfaces, peripheral device interfaces, and an interconnecting bus structure.

A computing device may effectively extend its CPU by using cloud computing to perform one or more computing functions (e.g., a service, an application, an algorithm, an arithmetic logic function, etc.) on behalf of the computing device. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Further, for large services, applications, and/or functions, cloud computing may be performed by multiple cloud computing resources in a distributed manner to improve the response time for completion of the service, application, and/or function. For example, Hadoop® (a registered trademark of The Apache Software Foundation) is an open source software framework that supports distributed applications enabling application execution by thousands of computers. Network storage is a computing capability that is typically offered by cloud computing providers. In particular, a user of cloud computing services may store and retrieve data on cloud infrastructure maintained by a cloud computing provider, such as a dispersed storage (DS) or dispersed storage network (DSN) system or memory. A computer may use cloud storage as part of its memory system. Cloud storage enables a user, via a computer, to store files, applications, etc., on an Internet storage system. The Internet storage system may include a redundant array of independent disks (RAID) system and/or a dispersed storage system (dispersed storage network memory) that uses an error correction scheme to encode data for storage.

A DSN memory may be used for storing unstructured data. In particular, in an example, a DSN memory may be used as an archive tier to hold data for an extended period of time. The basic layer of security is an access control policy that ensures that users interacting with the DSN memory have the proper credentials and are authorized to perform the set of operations they are performing on the system.

SUMMARY

In a first aspect of the invention, there is a method that includes: creating, by a computing device, a bucket template in a dispersed storage network (DSN) based on a first request, the bucket template including at least a first bucket parameter and at least one allowed value for the first bucket parameter; receiving, by the computing device, a second request to create a bucket in the DSN, the second request including at least a first value for the first bucket parameter; and creating, by the computing device, the bucket based on the first value for the first bucket parameter in the second request and the at least one allowed value for the first bucket parameter in the bucket template.

In another aspect of the invention, there is a computer program product that includes one or more computer readable storage media having program instructions collectively stored on the one or more computer readable storage media. The program instructions are executable to: create a bucket template in a dispersed storage network (DSN), the bucket template including at least a first bucket parameter and at least one allowed value for the first bucket parameter; receive a first request to create a bucket in the DSN; create the bucket in the DSN based on the first request and the bucket template; receive a second request to modify the bucket in the DSN, the second request including at least a first value for the first bucket parameter; and modify the bucket based on the first value for the first bucket parameter in the second request and the at least one allowed value for the first bucket parameter in the bucket template.

In another aspect of the invention, there is a system that includes: a processor, a computer readable memory, one or more computer readable storage media, and program instructions collectively stored on the one or more computer readable storage media. The program instructions executable to: create a bucket template in a dispersed storage network (DSN) based on a first request, the bucket template including at least a first bucket parameter and at least one allowed value for the first bucket parameter; receive a second request to create a bucket in the DSN, the second request including at least a first value for the first bucket parameter; and create the bucket based on the first value for the first bucket parameter in the second request and the at least one allowed value for the first bucket parameter in the bucket template.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 is a schematic block diagram of an example of dispersed storage error encoding of data in accordance with aspects of the present invention.

FIG. 6 is a schematic block diagram of a generic example of an error encoding function in accordance with aspects of the present invention.

FIG. 7 is a schematic block diagram of a specific example of an error encoding function in accordance with aspects of the present invention.

FIG. 8 is a schematic block diagram of an example of a slice name of an encoded data slice (EDS) in accordance with aspects of the present invention.

DETAILED DESCRIPTION

Figure 1:
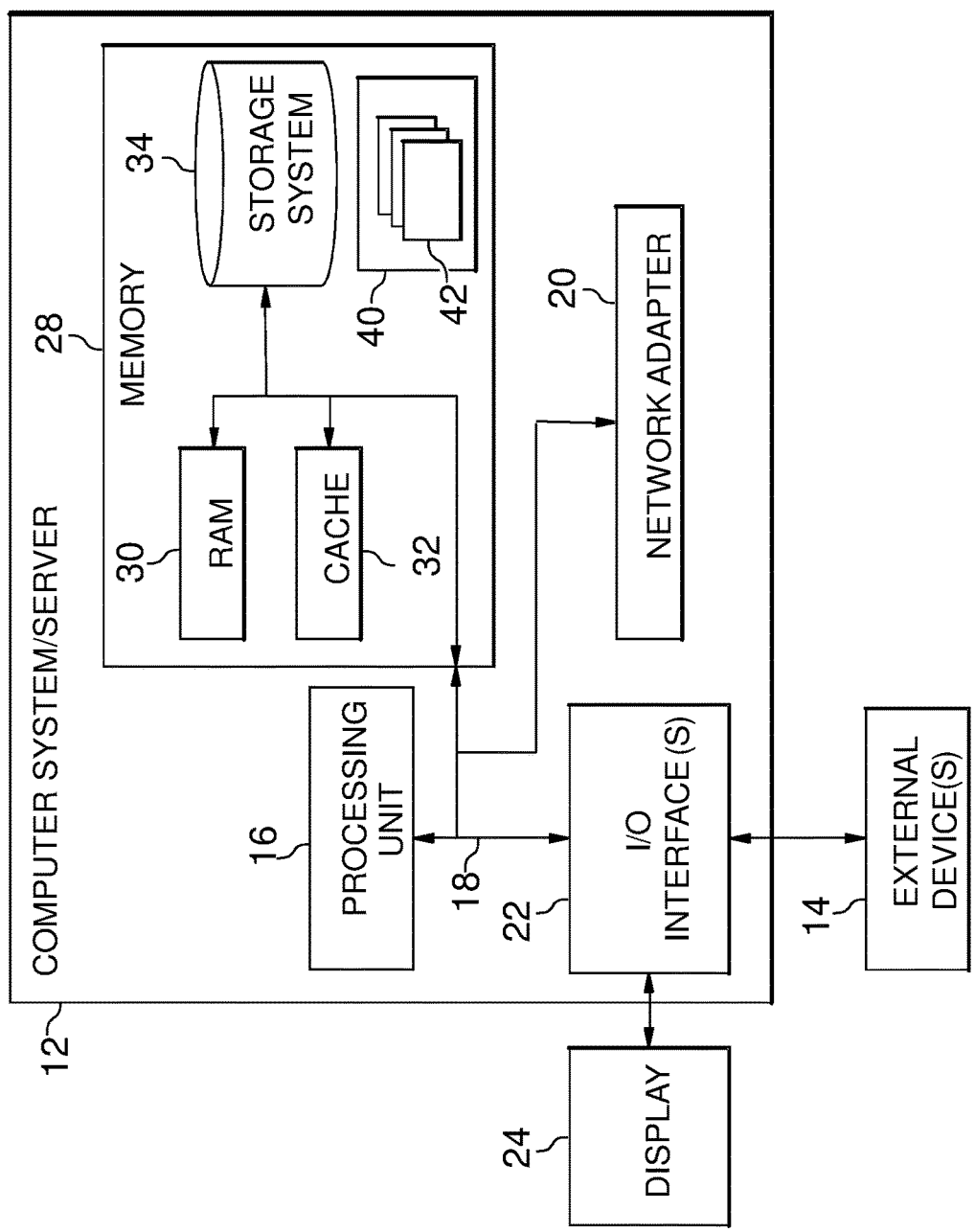
FIG. 1 depicts a cloud computing node according to an embodiment of the present invention.

Aspects of the present invention generally relate to computing devices and, more particularly, to methods and systems for data governance in a dispersed storage network using bucket templates. As described herein, aspects of the invention include a method and system that create bucket templates that include allowed values for various bucket parameters and use the allowed values in the bucket template to restrict the configurability of newly created and existing buckets in a DSN memory. In this manner, implementations of the invention provide for creation and enforcement of a governance policy in a DSN memory that a super user may leverage to tailor the DSN memory to match expected use cases.

In embodiments, a method and system is provided that includes: creating a bucket template to assist an end user in setting up a DSN memory bucket; applying the bucket template to one or more resources within the DSN memory; and enforcing the bucket template at the time the DSN memory bucket is created and also when the bucket configuration is modified.

In conventional systems, an access control policy may ensure that access is only granted after authentication and authorization. However, the access control policy may not prevent current authorized users from intentionally or unintentionally manipulating a resource (e.g., a bucket or an object) in the DSN memory in a manner that leaves the resource open for an exploit in the future (e.g., when the user may no longer have authorization on the resource). For example, a user that has the correct authorization can set a public access policy on a resource. This may make the resource accessible without any credentials and without any authorization. The user can then access the resource, even when they no longer have authorized access to the resource, due to the public access policy.

Embodiments address problems with users exposing data stored in DSN memory to exploits, either intentionally or unintentionally. Embodiments improve the functioning of a computer by providing methods and systems that ensure that data is held securely, accessed securely, and not exposed to exploits, either intentionally or unintentionally, by users that access the data. In particular, embodiments improve the functioning of a computer by providing a method and system that create bucket templates that include allowed values for various bucket parameters and use the allowed values in the bucket template to restrict the configurability of newly created and existing buckets in a DSN memory. Additionally, implementations of the invention use techniques that are, by definition, rooted in computer technology (e.g., DSNs, DS processing units, DS units, DS managers, and cloud computing).

In embodiments, an overarching governance policy is created that is applied to DSN memory resources in addition to the access control policy. In embodiments, the governance policy takes the form of bucket templates that include allowed values for various bucket parameters. In embodiments, the governance policy is controlled by a super user who is ultimately responsible for the security and integrity of the DSN memory resources. In embodiments, the DSN governance policy expresses various restrictions that are imposed during resource create, read, update, and delete (CRUD) operations. These restrictions allow the super user to tailor an otherwise flexible DSN memory control to be more strict, precise, and match the exact use case(s) that are necessary for the account or the system. In an example, a DSN memory deployment may have no use case that requires public access to DSN memory resources. In such a situation, the super user can create a governance policy that restricts any public access policies from being created for the DSN memory resources.

It should be understood that, to the extent implementations of the invention collect, store, or employ personal information provided by, or obtained from, individuals (for example, data stored in a DSN), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
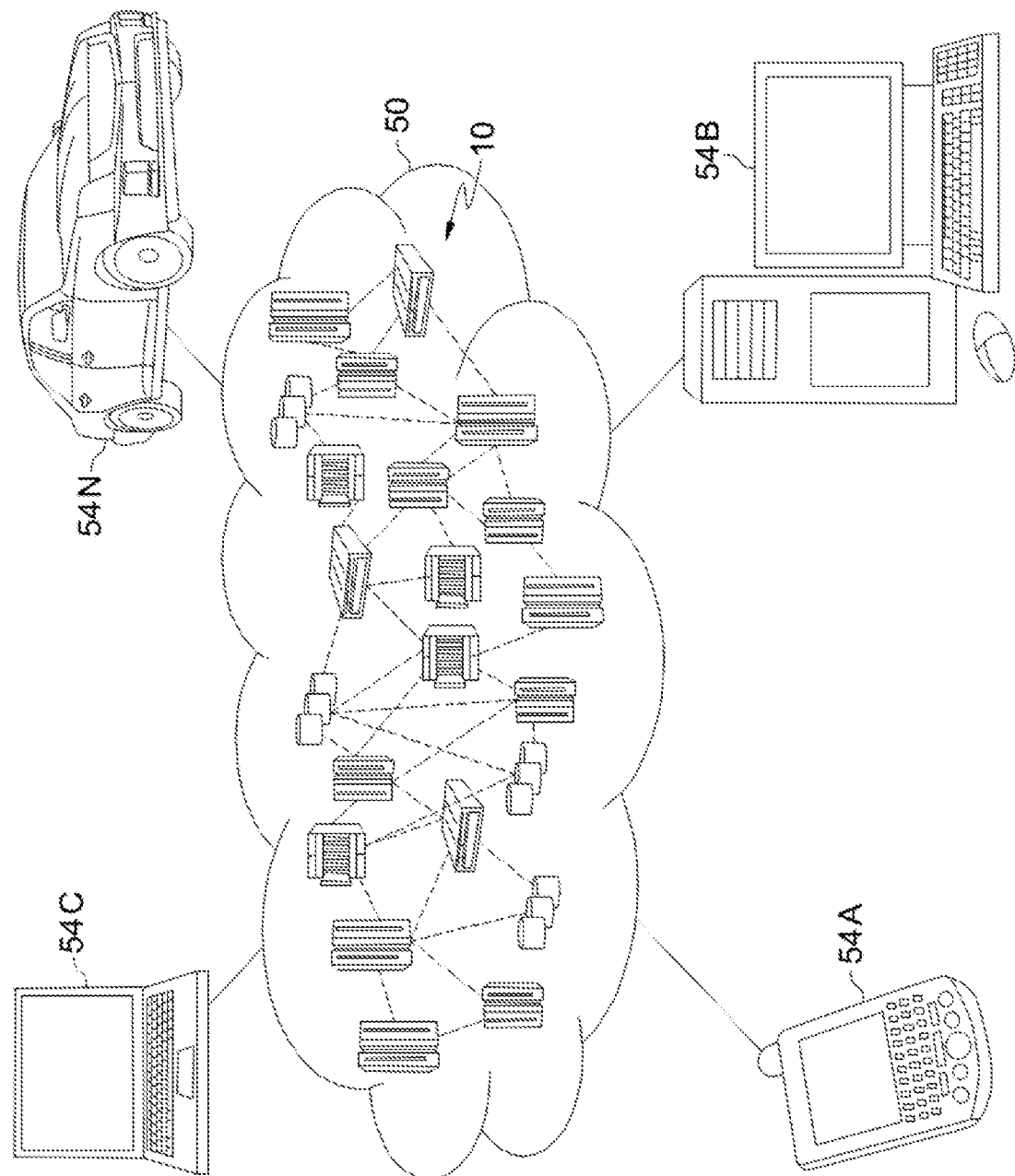
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
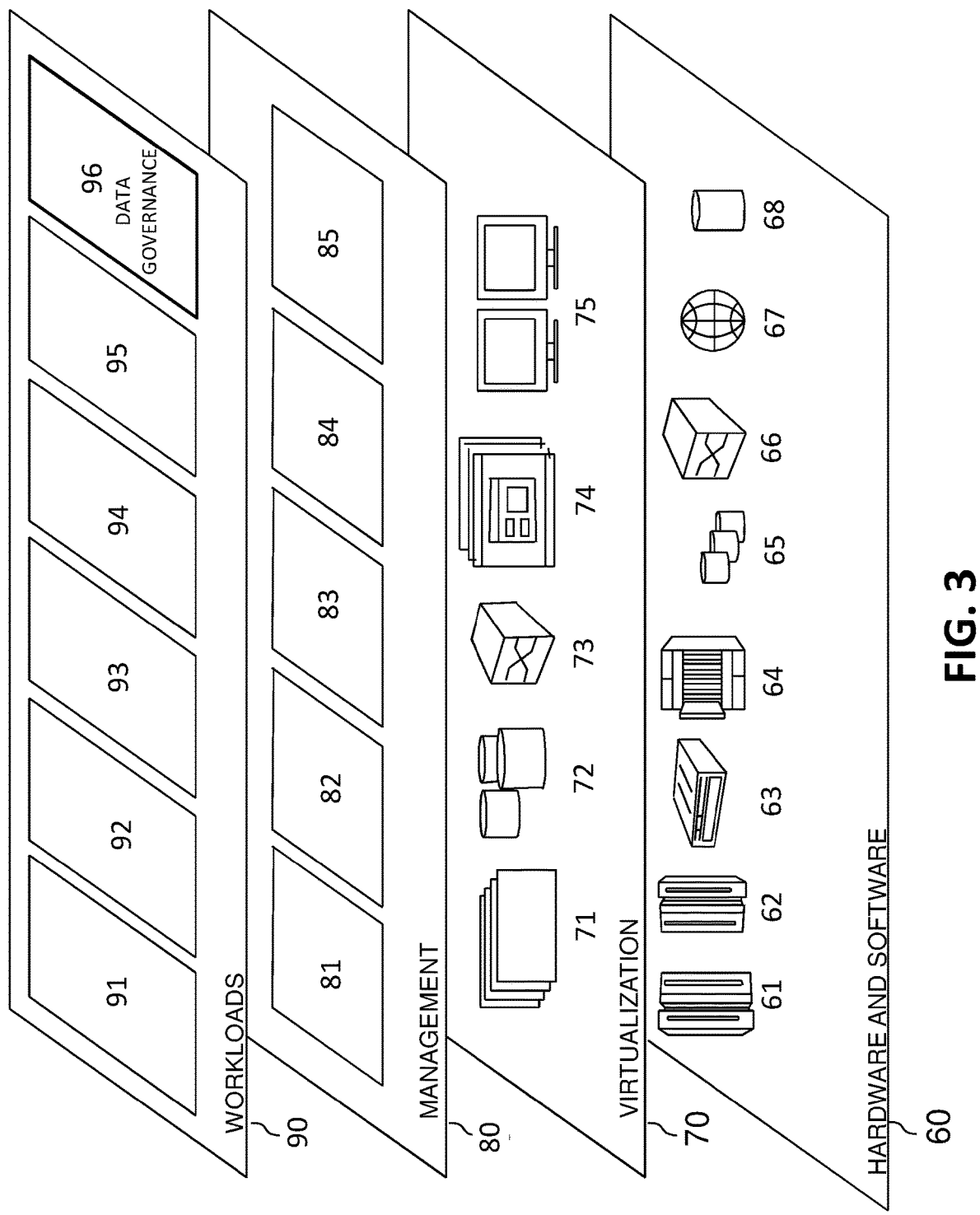
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data governance 96.

Implementations of the invention may include a computer system/server 12 of FIG. 1 in which one or more of the program modules 42 are configured to perform (or cause the computer system/server 12 to perform) one of more functions of the data governance 96 of FIG. 3. For example, the one or more of the program modules 42 may be configured to create bucket templates that include allowed values for various bucket parameters and use the allowed values in the bucket template to restrict the configurability of newly created and existing buckets in a DSN memory. Other functionalities of the program modules 42 are described further herein such that the program modules 42 are not limited to the functions described above. Moreover, it is noted that some of the program modules 42 can be implemented within the infrastructure shown in FIGS. 1-4. For example, the program modules 42 may be representative of a DS processing unit program module 415 as shown in FIG. 4.

Figure 4:
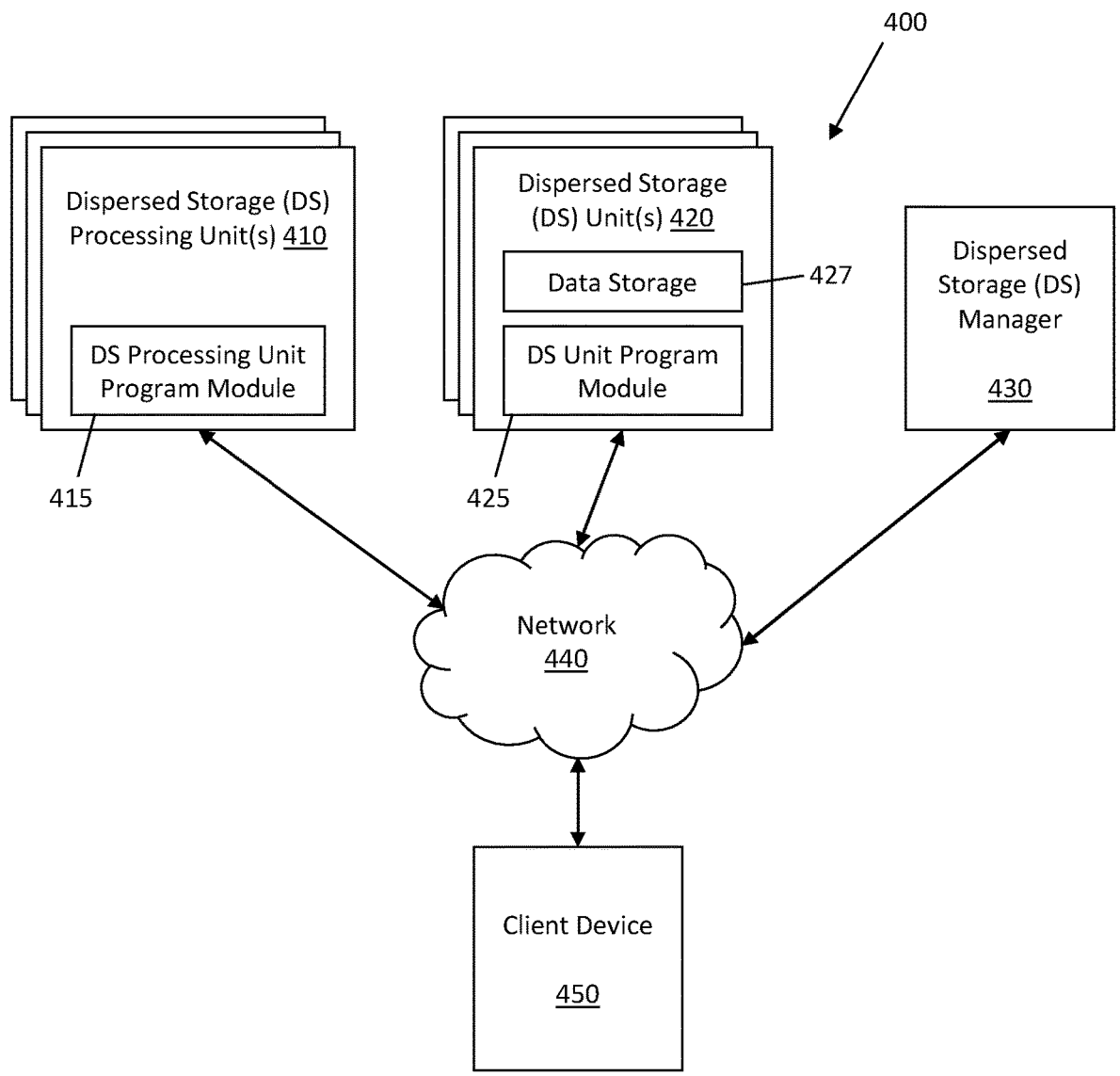
FIG. 4 shows a dispersed storage network (DSN) in accordance with aspects of the invention.

FIG. 4 shows a dispersed storage network 400 (referred to as DSN or dsNet) in accordance with aspects of the invention. In embodiments, the DSN 400 comprises plural dispersed storage processing units 410 (DS processing units), plural dispersed storage units 420 (DS units), and at least one dispersed storage manager 430 (DS manager). The DS processing units 410, the DS units 420, and the DS manager 430 all communicate via a network 440, which comprises one or more computer networks such as a LAN, WAN, and the Internet. In a cloud implementation, the network 440 is a cloud computing environment 50 of FIG. 2, and each of the DS processing units 410, the DS units 420, and the DS manager 430 are nodes 10 in the cloud computing environment 50.

In accordance with aspects of the invention, the DSN 400 stores data using object storage technology, which uses Information Dispersal Algorithms (IDAs) to separate a data object into slices that are distributed to plural ones of the DS units 420. As used herein, a slice is a dispersed piece of encoded data. Slices are created from an original data object and can be used to recreate the original data object. In particular, the DSN 400 creates slices using a combination of erasure coding, encryption, and dispersal algorithms. The erasure coding generates "extra" slices for each data object, such that the data object can be recreated from a subset (less than all of) the total number of slices that are stored for this data object. By dividing a data object into slices and storing the slices at plural different DS units 420, the DSN 400 ensures that no single one of the DS units 420 has all the slices that are necessary to recreate the data object. Moreover, by creating extra slices for each data object, the DSN 400 can tolerate multiple failures without losing the ability to recreate the original data object, e.g., from the available slices.

According to aspects of the invention, the DS manager 430 provides a management interface that is used for system administrative tasks, such as system configuration, storage provisioning, and monitoring the health and performance of the system. The DS manager 430 may comprise a physical device (e.g., a computer device such as computer system/server 12 of FIG. 1), a virtual machine (VM), or a container (e.g., a Docker container). The term "Docker" may be subject to trademark rights in various jurisdictions throughout the world and is used here only in reference to the products or services properly denominated by the mark to the extent that such trademark rights may exist.

According to aspects of the invention, the DS processing units 410 are configured to encrypt and encode data during a write operation, to manage the dispersal of slices of data during a write operation, and to decode and decrypt data during a read operation. In one example, during a write operation, one or more of the DS processing units 410 are configured to generate data slices for storage by performing a dispersed storage error encoding function on a set of data segments for storage, where the encoded data slices of a data segment are transmitted to an information dispersal algorithm (IDA) width threshold number of DS units 420. In this example, during a read operation, one or more of the DS processing units 410 are configured to recover a data segment by retrieving at least an IDA decode threshold number of encoded data slices from at least a corresponding IDA decode threshold number of DS units 420, and by performing a dispersed storage error decoding function on the received encoded data slices.

In embodiments, the DS processing units 410 are stateless components that present a storage interface to a client application and that transform data objects into slices using an IDA. Each DS processing unit 410 may comprise a physical device (e.g., a computer device such as a computer system/server 12 of FIG. 1), a virtual machine (VM), or a container (e.g., a Docker container).

In embodiments, each DS processing unit 410 comprises a DS processing unit program module 415 that is configured to perform processes of the DS processing unit 410 as described herein, e.g., encrypt and encode data during a write operation, manage the dispersal of slices of data during a write operation, decode and decrypt data during a read operation, and create bucket templates that include allowed values for various bucket parameters and use the allowed values in the bucket template to restrict the configurability of newly created and existing buckets in the DSN 400, etc. The DS processing unit program module 415 may comprise one or more program modules 42 as described with respect to FIG. 1.

According to aspects of the invention, the DS units 420 are configured to store the data slices that are received from a DS processing unit 410 during a write, and to return data slices to a DS processing unit 410 during a read. Each DS unit 420 may comprise a physical device (e.g., a computer device such as a computer system/server 12 of FIG. 1), a virtual machine (VM), or a container (e.g., a Docker container).

In embodiments, each DS unit 420 comprises DS unit program module 425 and data storage 427. The DS unit program module 425 may comprise one or more program modules 42 as described with respect to FIG. 1, and is configured to perform processes of the DS unit 420 as described herein, e.g., store data slices that are received from a DS processing unit 410 during a write, return data slices to a DS processing unit 410 during a read, and perform compaction of data in the data storage 427, etc.

In embodiments, the data storage 427 receives and stores data in accordance with instructions received from the DS unit program module 425. The data storage 427 is one or more of any type or combination of types of data storage medium, data storage device, or system (e.g., storage device 65 of FIG. 3) and is located on (or is accessible to) the DS unit 420. For example, the data storage 427 may include one or more hard drives, Shingled Magnetic Recording (SMR) drives, solid state drives (SSDs), Tape Drives, and other memory devices.

In implementations, a client device 450 runs a client application that communicates with one of the DS processing units 410 to perform data operations in the DSN 400. In embodiments, the client application uses application programming interfaces (APIs) to perform data operations in the DSN 400. In one example, a first API call (e.g., PUT) writes a data object to the DSN 400, a second API call (e.g., GET) reads a data object from the DSN 400, a third API call (e.g., DELETE) deletes a data object from the DSN 400, and a fourth API call (e.g., LIST) lists all the data objects in a bucket in the DSN 400. In embodiments, the client device 450 comprises a computer device such as a laptop computer, desktop computer, tablet computer, etc., and may comprise one or more components of the computer system/server 12 of FIG. 1. In embodiments, the client application running on the client device 450 is a software application, and may comprise one or more program modules 42 as described with respect to FIG. 1. In embodiments, the client device 450 communicates with one of the DS processing units 410 via the network 440.

FIGS. 5-10 illustrate an exemplary operation of the DSN 400. FIG. 5 is a schematic block diagram of an example of dispersed storage error encoding of data. When a DS processing unit 410 has data to store, it disperse storage error encodes the data in accordance with a dispersed storage error encoding process based on dispersed storage error encoding parameters. Here, the computing device stores a data object, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 6 and a specific example is shown in FIG. 7); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the DS processing unit 410 divides data object into a plurality of fixed sized data segments (e.g., 1 through Y of a fixed size in range of kilobytes to terabytes or more). The number of data segments created is dependent of the size of the data and the data segmenting protocol.

The DS processing unit 410 then disperse storage error encodes a data segment using the selected encoding function (e.g., Cauchy Reed-Solomon) to produce a set of encoded data slices. FIG. 6 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 7 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 5, the computing device also creates a slice name (SN) for each encoded data slice (EDS) in the set of encoded data slices. A typical format for a slice name 480 is shown in FIG. 8. As shown, the slice name (SN) 480 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory.

As a result of encoding, the DS processing unit 410 produces a plurality of sets of encoded data slices, which are provided with their respective slice names to the storage units (DS unit 420 numbers one through five in this example) for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 9:
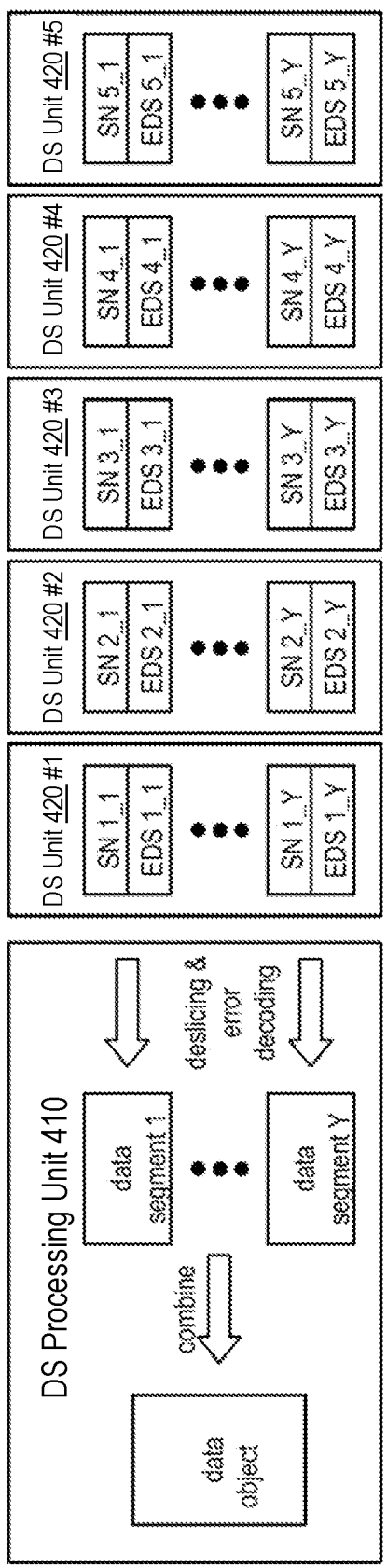
FIG. 9 is a schematic block diagram of an example of dispersed storage error decoding of data in accordance with aspects of the present invention.

FIG. 9 is a schematic block diagram of an example of dispersed storage error decoding of a data object that was dispersed storage error encoded and stored in the example of FIG. 6. In this example, the DS processing unit 410 retrieves from the storage units at least the decode threshold number of encoded data slices per data segment. As a specific example, the computing device retrieves a read threshold number of encoded data slices.

Figure 10:
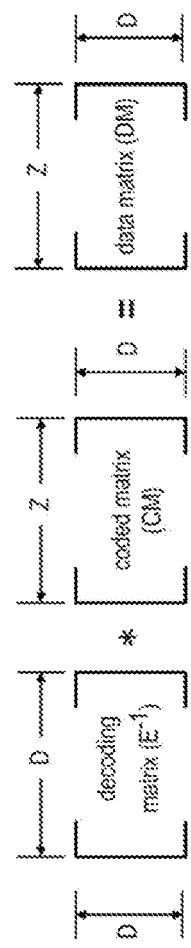
FIG. 10 is a schematic block diagram of a generic example of an error decoding function in accordance with aspects of the present invention.

To recover a data segment from a decode threshold number of encoded data slices, the computing device uses a decoding function as shown in FIG. 10. As shown, the decoding function is essentially an inverse of the encoding function of FIG. 6. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 11:
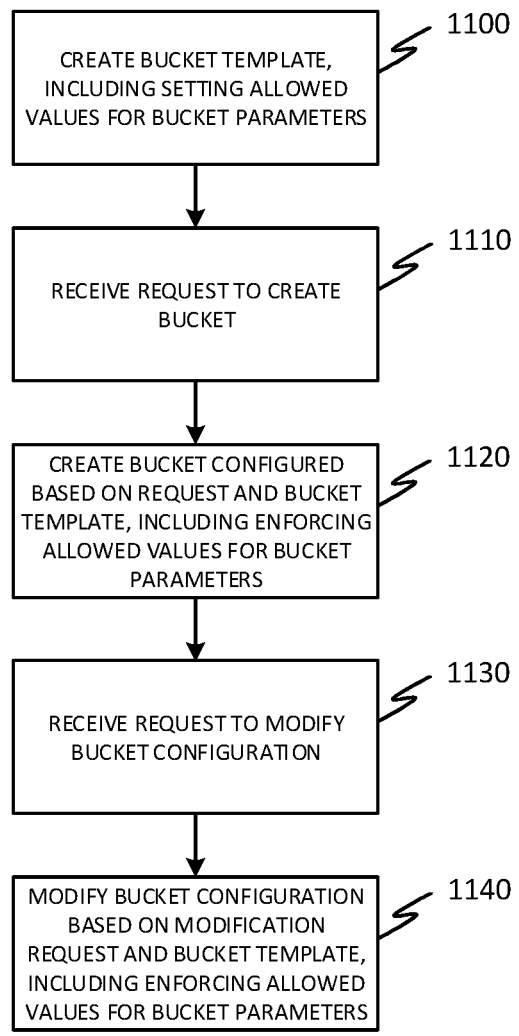
FIG. 11 depicts a flowchart of an exemplary method performed in accordance with aspects of the invention.

FIG. 11 depicts a flowchart of an exemplary method for creating bucket templates that include allowed values for various bucket parameters and using the allowed values in the bucket template to restrict the configurability of newly created and existing buckets in a DSN memory. The method of FIG. 11 is performed by the DS processing unit program module 415 of one or more of the DS processing units 410 in accordance with aspects of the invention. The steps of the method are performed in the environment of FIG. 4 and are described with reference to the elements shown in FIG. 4.

In embodiments, a bucket template is a model or preset format that is used by the DS processing unit program module 415 at the time when a memory bucket (e.g., a resource or storage location in the DSN 400 that stores encoded data slices or other data) is set up in the DSN 400, to assist an end user in setting up the memory bucket. The bucket template may include default values for parameters that are required during the creation of a memory bucket in the DSN 400. In an example, if a user of the DSN 400 is primarily interested in creating a memory bucket and using the memory bucket for an application, the bucket template may simplify the overall workflow for memory bucket creation by providing the default values for the parameters that are required during the creation of the memory bucket.

In embodiments, the parameters represent properties or characteristics of a memory bucket that can be configured to customize the memory bucket (e.g., based on a use case or workflow requirement for the memory bucket). In embodiments, the DS processing unit program module 415 provides for defining allowed values for memory bucket parameters in a bucket template in order to allow a super user to limit the configurability of memory buckets to avoid exposing the memory buckets to particular use cases (e.g., use cases that may be contrary to business requirements, business rules, security policies, and/or legal requirements) and prevent users from creating vulnerabilities (either intentional or unintentional) that may be exploited at time subsequent to bucket creation or modification.

An example of a parameter is a location constraint parameter that defines a geographic location in which a memory bucket is created. Examples of values for the location constraint parameter include a first geographic region, a second geographic region, and a third geographic region. In an example, in a particular bucket template, the allowed values for the location constraint parameter may be the second geographic region and the third geographic region. These allowed values may be defined by a super user based upon business requirements, business rules, security policies, legal requirements, and/or other considerations. For example, to satisfy a legal requirement, data may need to be stored in the second geographic region and the third geographic region.

Another example of a parameter is a firewall rule parameter that defines Internet Protocol (IP) addresses through which access to the resource is permitted. Examples of values for the firewall rule parameter include IP addresses and subnets. In an example, in a particular bucket template, the allowed values for the firewall rule parameter include a list of IP addresses that are internal to a company or organization. These allowed values may be defined by a super user based upon business requirements, business rules, security policies, legal requirements, and/or other considerations. For example, to satisfy a security policy, for a resource that does not require public access, the allowed values may include only the list of IP addresses that are internal to a company or organization, therefore blocking any public access from being set or being performed on the bucket.

In embodiments, the super user can create a bucket template that has a default value where the firewall rule default value is set to block all public access. In addition, the super user can also specify in the template that the allowed value for the firewall rule is only set to block public access. This will ensure that buckets governed by this template are always created with the firewall rule in place. In addition, it ensures that the firewall rule can never be deleted from the bucket.

Another example of a parameter is a key protect parameter that specifies a location from which an encryption or decryption key used with the memory bucket is fetched. Examples of values for the key protect parameter include network locations and IP addresses. In an example, in a particular bucket template, the allowed values for the key protect parameter include a particular IP address. These allowed values may be defined by a super user based upon business requirements, business rules, security policies, legal requirements, and/or other considerations. For example, to satisfy a security policy, the allowed values may include only a particular IP address from which a key may be fetched, in accordance with a security policy.

Another example of a parameter is an anonymous access parameter. Examples of values for the anonymous access parameter include "permit" and "deny". In an example, in a particular bucket template, the allowed values for the anonymous access parameter include "deny". These allowed values may be defined by a super user based upon business requirements, business rules, security policies, legal requirements, and/or other considerations. For example, to satisfy a security policy, the allowed values may include only the "deny" value if the expected use cases for the resource do not involve anonymous (public) access.

Another example of a parameter is an IP tracker parameter. Examples of values for the IP tracker parameter include "enabled" (i.e., audit/log IP addresses that access the bucket) and "disabled" (i.e., do not audit/log IP addresses that access the bucket). In an example, in a particular bucket template, the allowed values for the IP tracker parameter include "enabled". These allowed values may be defined by a super user based upon business requirements, business rules, security policies, legal requirements, and/or other considerations. For example, to satisfy a security policy, the allowed values may include only the "enabled" value.

At step 1100, the DS processing unit 410 creates a bucket template, including setting allowed values for bucket parameters. In embodiments, the DS processing unit program module 415 of the DS processing unit 410 receives a request, e.g., from a super user (administrator) of the DSN 400 via a client device 450, to create the bucket template. In embodiments, the request to create the bucket template includes allowed values for one or more bucket parameters. In embodiments, the request to create the bucket template may also include default values for one or more bucket parameters.

Still referring to step 1100, in embodiments, the bucket template is provisioned by a super user (i.e., the request to create the bucket template is received from a super user) and applies to a particular resource (e.g., buckets created by particular end users, data stored on DS unit 420, etc.) or a group of resources or all the resources for the DSN 400, as specified in the request received at step 1100. In embodiments, the request to create the bucket template includes allowed values for one or more bucket parameters (i.e., a set of allowed values). The set of allowed values, specified by the super user, define a governance policy for the DSN 400 that restricts the configurability of memory buckets in the DSN 400 such that parameters of the memory buckets for which allowed values are specified in the bucket template can only be set to values within the set of allowed values. In this manner, the DSN 400 may be configured to operate in accordance with security rules or policies of a business, organization, or other entity.

Still referring to FIG. 11, at step 1110, the DS processing unit 410 receives a request to create a bucket. In embodiments, the DS processing unit program module 415 of the DS processing unit 410 receives the request to create the bucket from an end user (e.g., a user other than the super user) via a client device 450. In embodiments, the end user may be unaware of the presence of the bucket template (created at step 1100). However, a simplified workflow for bucket creation by the DS processing unit program module 415 is enabled by the bucket template. In particular, the request to create the bucket received from the end user at step 1100 does not need to specify all of the parameters for the bucket to be created, because the DS processing unit program module 415 will retrieve default values for bucket parameters that are not specified in the request from the bucket template, as described below with respect to step 1120.

Still referring to step 1110, in other embodiments, the DS processing unit program module 415 of the DS processing unit 410 receives the request to create the bucket via an API call. The request to create the bucket received by the DS processing unit program module 415 may include values for one or more parameters of the bucket to be created. As described above, a simplified workflow for bucket creation by the DS processing unit program module 415 is enabled by the bucket template. In particular, the request to create the bucket received as an API call at step 1100 does not need to specify all of the parameters for the bucket to be created, because the DS processing unit program module 415 will retrieve default values for bucket parameters that are not specified in the request from the bucket template, as described below with respect to step 1120.

Still referring to FIG. 11, at step 1120, the DS processing unit 410 creates a bucket that is configured based on the request and the bucket template, including enforcing allowed values for bucket parameters. In embodiments, the DS processing unit program module 415 of the DS processing unit 410 creates the bucket in response to receiving the request at step 1110, using the values for the one or more parameters of the bucket included in the request received at step 1110.

Still referring to step 1120, for each of the bucket parameters for which the request received at step 1110 does not include a value, the DS processing unit program module 415 of the DS processing unit 410 sets the value of the bucket parameter to a default value specified in the bucket template created at step 1100. Additionally, for each of the bucket parameters for which the request received at step 1110 includes a value, the DS processing unit program module 415 of the DS processing unit 410 determines whether or not the bucket template created at step 1100 includes allowed values for the bucket parameter. If the bucket template does not include allowed values for the bucket parameter, then the DS processing unit program module 415 sets the value for the bucket parameter to the value included in the request received at step 1110 while creating the bucket.

Still referring to step 1120, if, on the other hand, the bucket template includes allowed values for the bucket parameter, the DS processing unit program module 415 determines whether or not the value included in the request received at step 1110 falls within the allowed values for the bucket parameter specified in the bucket template created at step 1100. If the value included in the request falls within the allowed values for the bucket parameter, then the DS processing unit program module 415 sets the value of the parameter to the value included in the request while creating the bucket. On the other hand, if the value included in the request does not fall within the allowed values for the bucket parameter, the DS processing unit program module 415 either returns an error (e.g., as a message to the end user of the client device 450, or as a response to the API call) instead of creating the bucket (i.e., the bucket creation request is rejected) or creates the bucket but sets the value of the parameter to a default value included in the bucket template and/or to another predetermined value that is an allowed value for the bucket parameter instead of the value included in the request, while optionally returning an error (e.g., as a message to the end user of the client device 450, or as a response to the API call).

Still referring to FIG. 11, at step 1130, the DS processing unit 410 receives a request to modify a bucket configuration. In embodiments, the DS processing unit program module 415 of the DS processing unit 410 receives the request to modify the bucket configuration from an end user (e.g., a user other than the super user) via a client device 450. In other embodiments, the DS processing unit program module 415 of the DS processing unit 410 receives the request to modify the bucket configuration via an API call. The request to modify the bucket configuration received by the DS processing unit program module 415 may include values for one or more parameters of the bucket to be modified.

Still referring to FIG. 11, at step 1140, the DS processing unit 410 modifies the bucket configuration based on the modification request and the bucket template, including enforcing allowed values for bucket parameters. In embodiments, the DS processing unit program module 415 of the DS processing unit 410 modifies the bucket configuration in response to receiving the modification request at step 1130, using the values for the one or more parameters of the bucket to be modified included in the request received at step 1130.

Still referring to step 1140, for each of the bucket parameters for which the modification request received at step 1130 includes a value, the DS processing unit program module 415 of the DS processing unit 410 determines whether or not the bucket template created at step 1100 includes allowed values for the bucket parameter. If the bucket template does not include allowed values for the bucket parameter, then the DS processing unit program module 415 modifies the value for the bucket parameter to correspond to the value included in the modification request received at step 1130.

Still referring to step 1140, if, on the other hand, the bucket template includes allowed values for the bucket parameter, the DS processing unit program module 415 determines whether or not the value included in the modification request received at step 1130 falls within the allowed values for the bucket parameter specified in the bucket template created at step 1100. If the value included in the modification request falls within the allowed values for the bucket parameter, then the DS processing unit program module 415 modifies the value of the parameter to the value included in the modification request. On the other hand, if the value included in the modification request does not fall within the allowed values for the bucket parameter, the DS processing unit program module 415 either returns an error (e.g., as a message to the end user of the client device 450, or as a response to the API call) instead of modifying the bucket or modifies the bucket but sets the value of the parameter to a default value included in the bucket template and/or to another predetermined value that is an allowed value for the bucket parameter instead of the value included in the modification request, while optionally returning an error (e.g., as a message to the user of the client device 450, or as a response to the API call).

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

creating, by a computing device, a bucket template in a dispersed storage network (DSN) based on a first request, the bucket template including at least a first bucket parameter and at least one allowed value for the first bucket parameter, wherein the first request is a request to create the bucket template and the first request includes the at least one allowed value for the first bucket parameter, and the at least one allowed value for the first bucket parameter defines a governance policy that restricts configurability of the DSN;

receiving, by the computing device, a second request to create a bucket in the DSN, the second request including at least a first value for the first bucket parameter; and creating, by the computing device, the bucket based on the first value for the first bucket parameter in the second request and the at least one allowed value for the first bucket parameter in the bucket template.

2. The method according to claim 1, wherein the creating the bucket comprises:

determining, by the computing device, that the first value is one of the at least one allowed value for the first bucket parameter; and in response to determining that the first value is one of the at least one allowed value for the first bucket parameter, the computing device setting the first bucket parameter to the first value.

3. The method according to claim 1, wherein the bucket template further includes a default value for the first bucket parameter, wherein the default value for the first bucket parameter is received in the first request.

4. The method according to claim 3, wherein the creating the bucket comprises:

determining, by the computing device, that the first value is not one of the at least one allowed value for the first bucket parameter; and in response to determining that the first value is not one of the at least one allowed value for the first bucket parameter, the computing device setting the first bucket parameter to the default value.

5. The method according to claim 4, further comprising, in response to determining that the first value is not one of the at least one allowed value for the first bucket parameter, the computing device returning an error.

6. The method according to claim 1, wherein the first request and the second request are received via application programming interface calls.

7. The method according to claim 1, wherein:

the bucket template further includes a second bucket parameter and a default value for the second bucket parameter, the creating the bucket comprises:

determining, by the computing device, that the second request does not include a value for the second bucket parameter; and in response to determining that the second request does not include the value for the second bucket parameter, the computing device setting the second bucket parameter to the default value for the second bucket parameter, and the bucket template includes plural bucket parameters including the first bucket parameter and the second bucket parameter, the plural bucket parameters including:

a location constraint parameter that defines a geographic location in which a memory bucket is created;

a firewall rule parameter that defines Internet Protocol (IP) addresses through which access to a resource is permitted;

a key protect parameter that specifies a location from which an encryption or decryption key used with a memory bucket is fetched;

an anonymous access parameter; and an IP tracker parameter.

8. A computer program product comprising one or more computer readable storage media having program instructions collectively stored on the one or more computer readable storage media, the program instructions executable to:

create a bucket template in a dispersed storage network (DSN), the bucket template including at least a first bucket parameter and at least one allowed value for the first bucket parameter, wherein the first request is a request to create the bucket template and the first request includes the at least one allowed value for the first bucket parameter, and the at least one allowed value for the first bucket parameter defines a governance policy that restricts configurability of the DSN;

receive a first request to create a bucket in the DSN;

create the bucket in the DSN based on the first request and the bucket template;

receive a second request to modify the bucket in the DSN, the second request including at least a first value for the first bucket parameter; and modify the bucket based on the first value for the first bucket parameter in the second request and the at least one allowed value for the first bucket parameter in the bucket template.

9. The computer program product according to claim 8, wherein the modifying the bucket comprises:

determining that the first value is one of the at least one allowed value for the first bucket parameter; and in response to determining that the first value is one of the at least one allowed value for the first bucket parameter, modifying the first bucket parameter to the first value.

10. The computer program product according to claim 8, wherein the bucket template further includes a default value for the first bucket parameter, wherein the default value for the first bucket parameter is received in the first request.

11. The computer program product according to claim 10, wherein the modifying the bucket comprises:

determining that the first value is not one of the at least one allowed value for the first bucket parameter; and in response to determining that the first value is not one of the at least one allowed value for the first bucket parameter, modifying the first bucket parameter to the default value.

12. The computer program product according to claim 11, wherein the program instructions are further executable to, in response to determining that the first value is not one of the at least one allowed value for the first bucket parameter, return an error.

13. The computer program product according to claim 8, wherein the first request and the second request are received via application programming interface calls.

14. A system comprising:
a processor, a computer readable memory, one or more computer readable storage media, and program instructions collectively stored on the one or more computer readable storage media, the program instructions executable to:
create a bucket template in a dispersed storage network (DSN) based on a first request, the bucket template including at least a first bucket parameter and at least one allowed value for the first bucket parameter, wherein the first request is a request to create the bucket template, the first request includes the at least one allowed value for the first bucket parameter, and the at least one allowed value for the first bucket parameter defines a governance policy that restricts configurability of the DSN;
receive a second request to create a bucket in the DSN, the second request including at least a first value for the first bucket parameter; and
create the bucket based on the first value for the first bucket parameter in the second request and the at least one allowed value for the first bucket parameter in the bucket template.

15. The system according to claim 14, wherein the creating the bucket comprises:
determining that the first value is one of the at least one allowed value for the first bucket parameter; and
in response to determining that the first value is one of the at least one allowed value for the first bucket parameter, setting the first bucket parameter to the first value.

16. The system according to claim 14, wherein the bucket template further includes a default value for the first bucket parameter, wherein the default value for the first bucket parameter is received in the first request.

17. The system according to claim 16, wherein the program instructions are further executable to:
determine that the first value is not one of the at least one allowed value for the first bucket parameter; and
in response to determining that the first value is not one of the at least one allowed value for the first bucket parameter, set the first bucket parameter to the default value.

18. The system according to claim 17, wherein the program instructions are further executable to, in response to determining that the first value is not one of the at least one allowed value for the first bucket parameter, return an error.

19. The system according to claim 14, wherein the first request and the second request are received via application programming interface calls.

20. The system according to claim 14, wherein:
the bucket template further includes a second bucket parameter and a default value for the second bucket parameter, and
the creating the bucket comprises:
determining that the second request does not include a value for the second bucket parameter; and
in response to determining that the second request does not include the value for the second bucket parameter, setting the second bucket parameter to the default value for the second bucket parameter.

\* \* \* \* \*